(12) United States Patent
Brockie

(10) Patent No.: US 9,909,713 B1
(45) Date of Patent: Mar. 6, 2018

(54) GARAGE LIFT SYSTEM

(71) Applicant: Storagelevator, LLC, Tavares, FL (US)

(72) Inventor: Scott R. Brockie, Tavares, FL (US)

(73) Assignee: Brock Lift, LLC, Tavares, FL (US)

( * ) Notice: Subject to any disclaimer, the term of this patent is extended or adjusted under 35 U.S.C. 154(b) by 422 days.

(21) Appl. No.: 14/267,030

(22) Filed: May 1, 2014

(51) Int. Cl.
 *F16M 13/02* (2006.01)
 *B66D 1/26* (2006.01)

(52) U.S. Cl.
 CPC .............. *F16M 13/022* (2013.01); *B66D 1/26* (2013.01)

(58) Field of Classification Search
 CPC ........... B66D 3/04; B66D 1/26; F16M 13/022
 USPC ....................................................... 254/338
 See application file for complete search history.

(56) References Cited

U.S. PATENT DOCUMENTS

| | | | |
|---|---|---|---|
| 300,344 A * | 6/1884 | Chamblin et al. | B66D 1/26 254/286 |
| 410,507 A | 9/1889 | Fain | |
| 695,998 A | 3/1902 | Beebe | |
| 983,957 A | 2/1911 | Trantham | |
| 2,686,659 A | 8/1954 | Bittner | |
| 3,809,422 A | 5/1974 | Schlough | |
| 3,964,573 A * | 6/1976 | Wilson | B66F 9/02 182/116 |
| 4,065,100 A | 12/1977 | Walsh | |
| D257,028 S | 9/1980 | Scott Row | |
| 4,236,859 A * | 12/1980 | Stearn | B63C 3/12 254/281 |
| 4,408,728 A | 10/1983 | Pittman | |
| 4,600,177 A | 7/1986 | Fritz | |
| 4,861,218 A * | 8/1989 | Lamer | B60P 3/1091 254/273 |
| 4,892,203 A | 1/1990 | Arav | |
| 4,927,537 A | 5/1990 | Meurer | |
| 5,263,687 A | 11/1993 | Garbiso | |
| 5,280,715 A | 1/1994 | Baldwin | |
| 5,281,077 A * | 1/1994 | Phillips | B66F 7/02 187/242 |
| 5,337,908 A * | 8/1994 | Beck, Jr. | A61G 7/1015 104/126 |
| 5,362,196 A * | 11/1994 | Beattie | B66F 7/04 254/89 H |
| 5,897,104 A | 4/1999 | Garbiso | |
| 6,049,923 A * | 4/2000 | Ochiai | A61G 7/1011 5/83.1 |

(Continued)

*Primary Examiner* — Michael E Gallion
(74) *Attorney, Agent, or Firm* — Beusse, Wolter, Sanks & Maire, PLLC; Erica M. Cipparone; Terry M. Sanks

(57) ABSTRACT

A garage lift system which aids in lifting and storing various objects such as ATV's within an enclosed area. The garage lift system generally includes a frame adapted to be secured between a floor and a ceiling utilizing upper mounts and lower footings. The frame includes a guide rail extending horizontally between two or more vertical supports. A drive assembly is provided which includes a motor driving a pair of reels. The reels are wound with cables, with a first cable extending downwardly to connect to a first end of a lift member and a second cable extending along the guide rail and through a pulley wheel prior to extending downwardly to connect to a second end of the lift member. Various objects such as vehicles may be positioned on the lift member and the drive assembly utilized to raise or lower the lift member.

19 Claims, 8 Drawing Sheets

(56) References Cited

U.S. PATENT DOCUMENTS

| | | | |
|---|---|---|---|
| 6,056,274 A | 5/2000 | Naas | |
| 6,105,938 A | 8/2000 | Koida | |
| 6,152,427 A | 11/2000 | Hoslett | |
| 6,345,724 B1 * | 2/2002 | Masumoto | B66C 11/20 |
| | | | 212/173 |
| 6,386,515 B1 | 5/2002 | Sachtleben | |
| 6,507,962 B2 | 1/2003 | Thurston | |
| 6,957,804 B2 | 10/2005 | Heggestad | |
| 6,959,918 B1 * | 11/2005 | Samuels | B60J 7/106 |
| | | | 248/327 |
| 6,969,049 B2 * | 11/2005 | Bilcik | A01M 31/006 |
| | | | 254/278 |
| 6,991,064 B2 | 1/2006 | Ehrenleitner | |
| 7,025,334 B2 | 4/2006 | Ehrenleitner | |
| 7,150,449 B1 * | 12/2006 | Dueck | B62H 3/12 |
| | | | 248/320 |
| 7,527,242 B2 * | 5/2009 | Shaha | B66D 3/04 |
| | | | 182/144 |
| 7,610,636 B2 * | 11/2009 | Holmes | B60P 3/36 |
| | | | 105/317 |
| 8,056,883 B1 * | 11/2011 | Brockie | B66D 3/04 |
| | | | 254/278 |
| 8,544,823 B2 * | 10/2013 | Imberi | B66D 1/36 |
| | | | 254/338 |
| 8,678,209 B2 * | 3/2014 | Chernyak | B66C 6/00 |
| | | | 212/312 |
| 8,960,459 B2 * | 2/2015 | Givens | B66C 5/02 |
| | | | 212/328 |
| 2002/0084238 A1 * | 7/2002 | Zingerman | B66C 23/22 |
| | | | 212/179 |
| 2002/0178497 A1 * | 12/2002 | Thurston | A47C 17/84 |
| | | | 5/10.1 |
| 2004/0046161 A1 * | 3/2004 | Payne | B60J 7/102 |
| | | | 254/266 |
| 2005/0211654 A1 * | 9/2005 | Waisanen | B66C 13/06 |
| | | | 212/330 |
| 2006/0045710 A1 * | 3/2006 | Hiebert | B66F 7/28 |
| | | | 414/631 |
| 2007/0158290 A1 * | 7/2007 | Lerchenmueller | B66C 13/06 |
| | | | 212/274 |
| 2007/0163982 A1 * | 7/2007 | Lichinchi | B66C 19/02 |
| | | | 212/175 |
| 2007/0204520 A1 * | 9/2007 | Calleja | E04H 3/26 |
| | | | 52/7 |
| 2011/0127477 A1 * | 6/2011 | Kokolis | B66C 13/16 |
| | | | 254/285 |
| 2013/0269163 A1 * | 10/2013 | Sears | B66B 11/08 |
| | | | 29/426.2 |
| 2013/0315698 A1 * | 11/2013 | DiSandro | B65G 67/02 |
| | | | 414/572 |
| 2014/0138340 A1 * | 5/2014 | Miller | B66D 1/36 |
| | | | 212/336 |
| 2016/0008650 A1 * | 1/2016 | Jue | A63B 22/02 |
| | | | 482/54 |

\* cited by examiner

GARAGE LIFT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a lift and more specifically it relates to a garage lift system which aids in lifting and storing various objects such as ATV's within an enclosed area.

Description of the Related Art

Any discussion of the related art throughout the specification should in no way be considered as an admission that such related art is widely known or forms part of common general knowledge in the field.

Enclosed storage areas like garages often become cluttered with various objects such as vehicles, tools, boxes, and the like. With such limited space in such storage areas, there is always a demand for new and innovative ways for making the most out of the limited square footage.

Particularly in garages, clutter can lead to damage to vehicles which either hit such cluttered objects or risk having such cluttered objects falling over and causing damage. It can also be time-consuming to move objects or vehicles out of the way to gain access to something, such as a recreational vehicle, that may be stored in the back of the storage area.

Because of the inherent problems with the related art, there is a need for a new and improved garage lift system which aids in lifting and storing various objects such as ATV's within an enclosed area.

BRIEF SUMMARY OF THE INVENTION

The invention generally relates to a garage lift system which includes a frame adapted to be secured between a floor and a ceiling utilizing upper mounts and lower footings. The frame includes a guide rail extending horizontally between two or more vertical supports. A drive assembly is provided which includes a motor driving a pair of reels. The reels are wound with cables, with a first cable extending downwardly to connect to a first end of a lift member and a second cable extending along the guide rail and through a pulley wheel prior to extending downwardly to connect to a second end of the lift member. Various objects such as vehicles may be positioned on the lift member and the drive assembly utilized to raise or lower the lift member.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
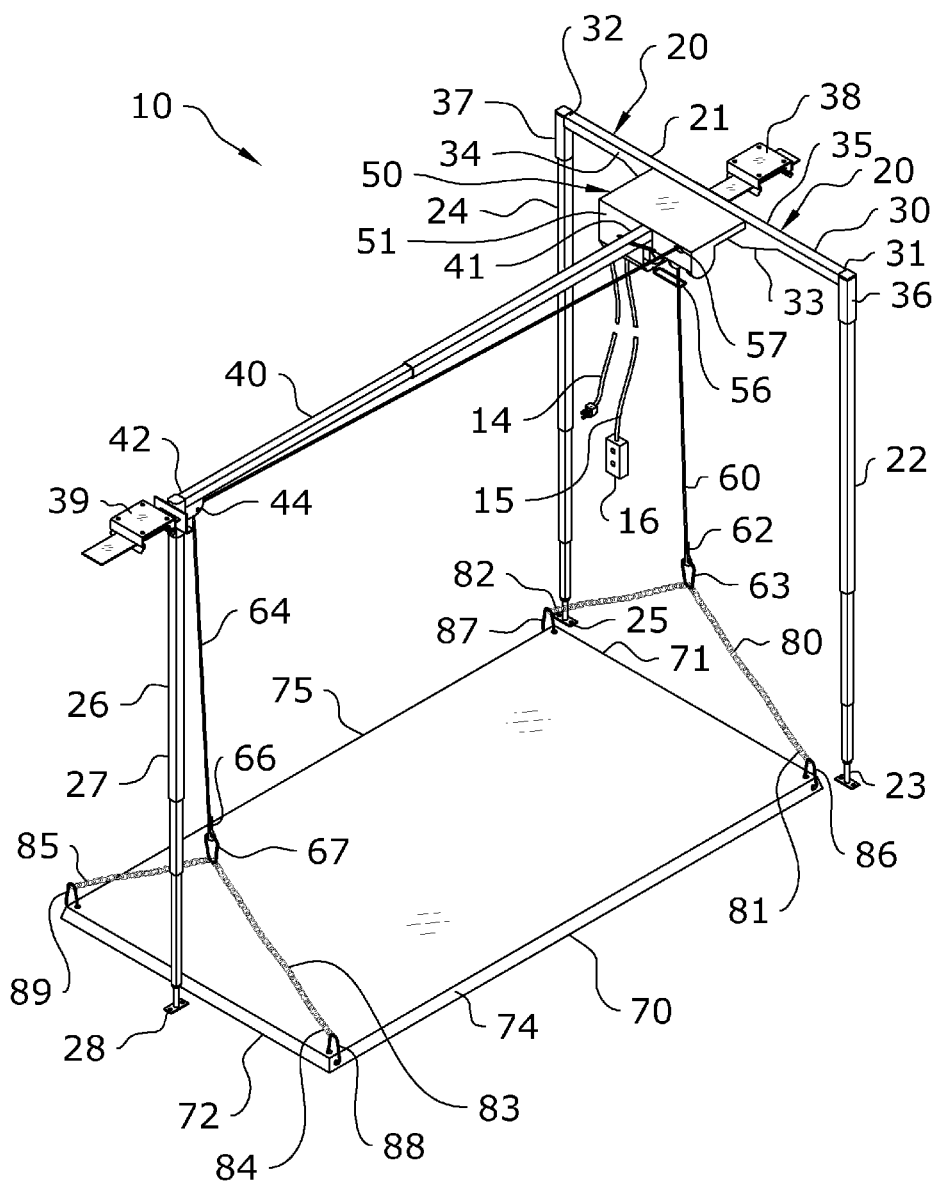
FIG. 1 is a first end upper perspective view of the present invention.

A. Overview.

Turning now descriptively to the drawings, in which similar reference characters denote similar elements throughout the several views, FIGS. 1 through 8 illustrate a garage lift system 10, which comprises a frame 20 adapted to be secured between a floor 18 and a ceiling 19 utilizing upper mounts 38, 39 and lower footings 23, 25, 28. The frame 20 includes a guide rail 40 extending horizontally between two or more vertical supports 22, 24, 27. A drive assembly 50 is provided which includes a motor 52 driving a pair of reels 54, 55. The reels 54, 55 are wound with cables 60, 64, with a first cable 60 extending downwardly to connect to a first end 71 of a lift member 70 and the second cable 64 extending along the guide rail 40 and through a pulley wheel 44 prior to extending downwardly to connect to a second end 72 of the lift member 70. Various objects 12 such as vehicles may be positioned on the lift member 70 and the drive assembly 50 utilized to raise or lower the lift member 70.

B. Frame.

As shown throughout the figures, the present invention includes a frame 20 which is generally installed between a floor 18 and a ceiling 19 to support the lift member 70 of the present invention. The frame 20 may be comprised of various shapes, sizes, and configurations. Thus, the scope of the present invention should not be construed as limited by the exemplary frame 20 configuration shown in the figures. For example, the dimensions, spacing of components, and/or number of vertical supports 21, 24, 27, among other things, could vary in different embodiments to suit different applications.

The frame 20 will generally include one or more vertical supports 22, 24, 27 comprised of elongated members which are adapted to be secured between two horizontal surfaces, such as a floor 18 and a ceiling 19. The vertical supports 22, 24, 27 may be of a fixed length or may be comprised of telescopic configurations as known in the art and shown in the figures.

In the embodiment shown in the figures, a first side 21 of the frame 20 includes a first vertical support 22 and a second vertical support 24. The second side 26 of the frame 20 includes a third vertical support 27, though additional vertical supports could be included on the second side 26 of the frame 20 in certain embodiments. In some embodiments, the first side 21 may include only a single vertical support 22.

The vertical supports 22, 24, 27 may include footings 23, 25, 28 such as brackets which are adapted to be secured to a lower horizontal surface, such as the floor 18. In the embodiment shown in the figures, the first vertical support 22 includes a first footing 23, the second vertical support 24 includes a second footing 25, and the third vertical support 27 includes a third footing 28.

Figure 2:
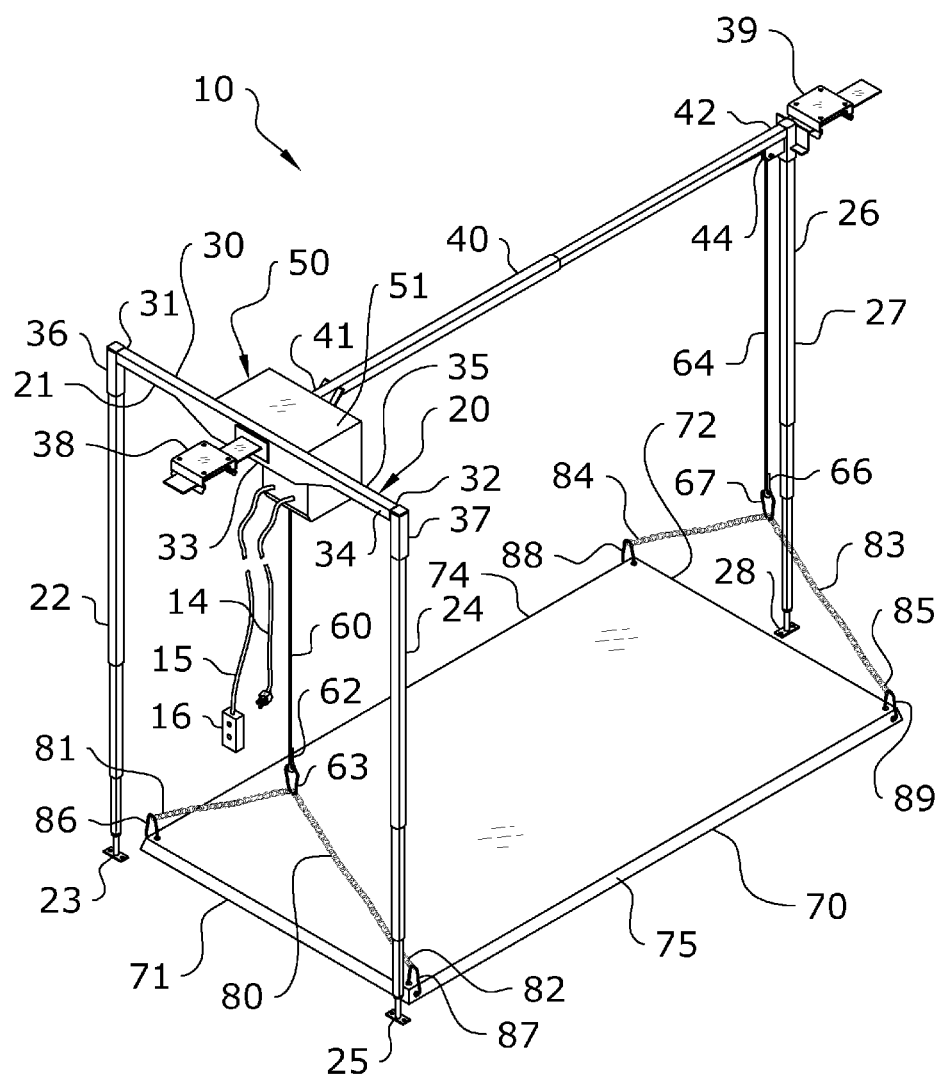
FIG. 2 is a second end upper perspective view of the present invention.
Figure 3:
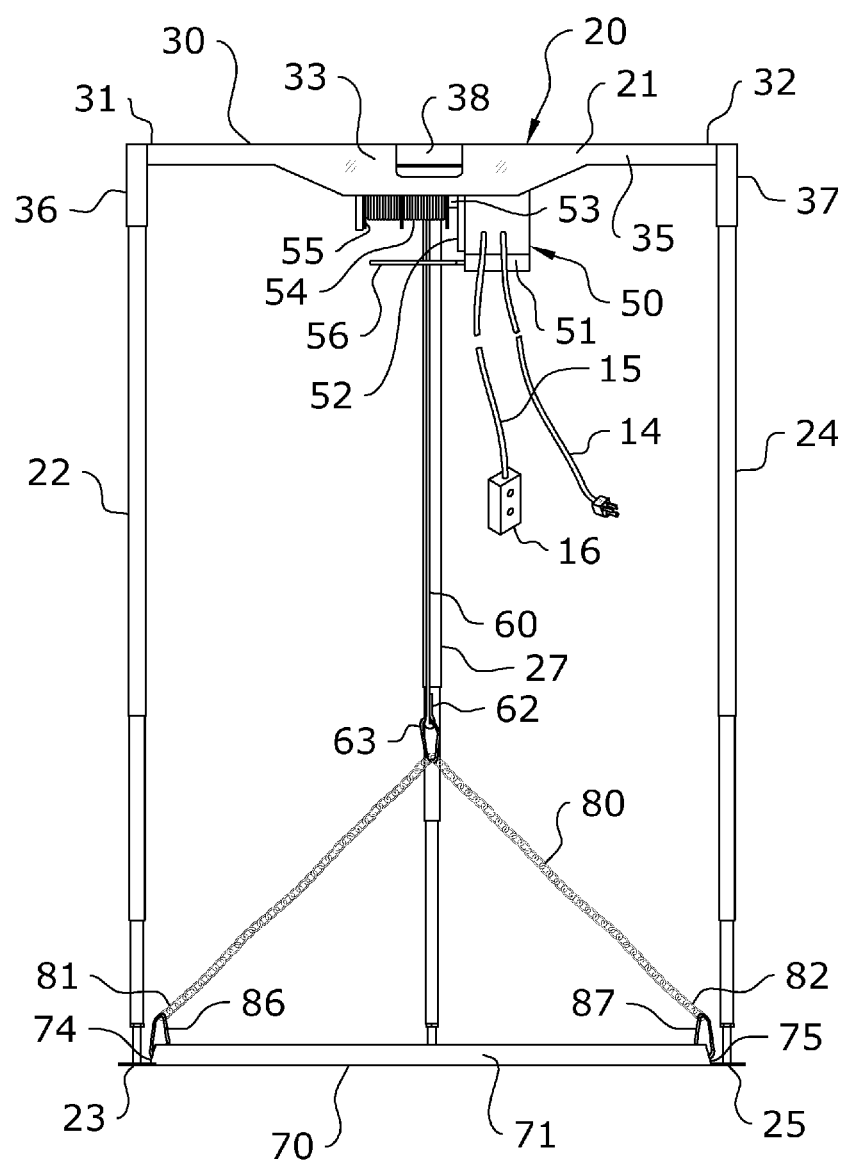
FIG. 3 is a first end view of the present invention.
Figure 4:
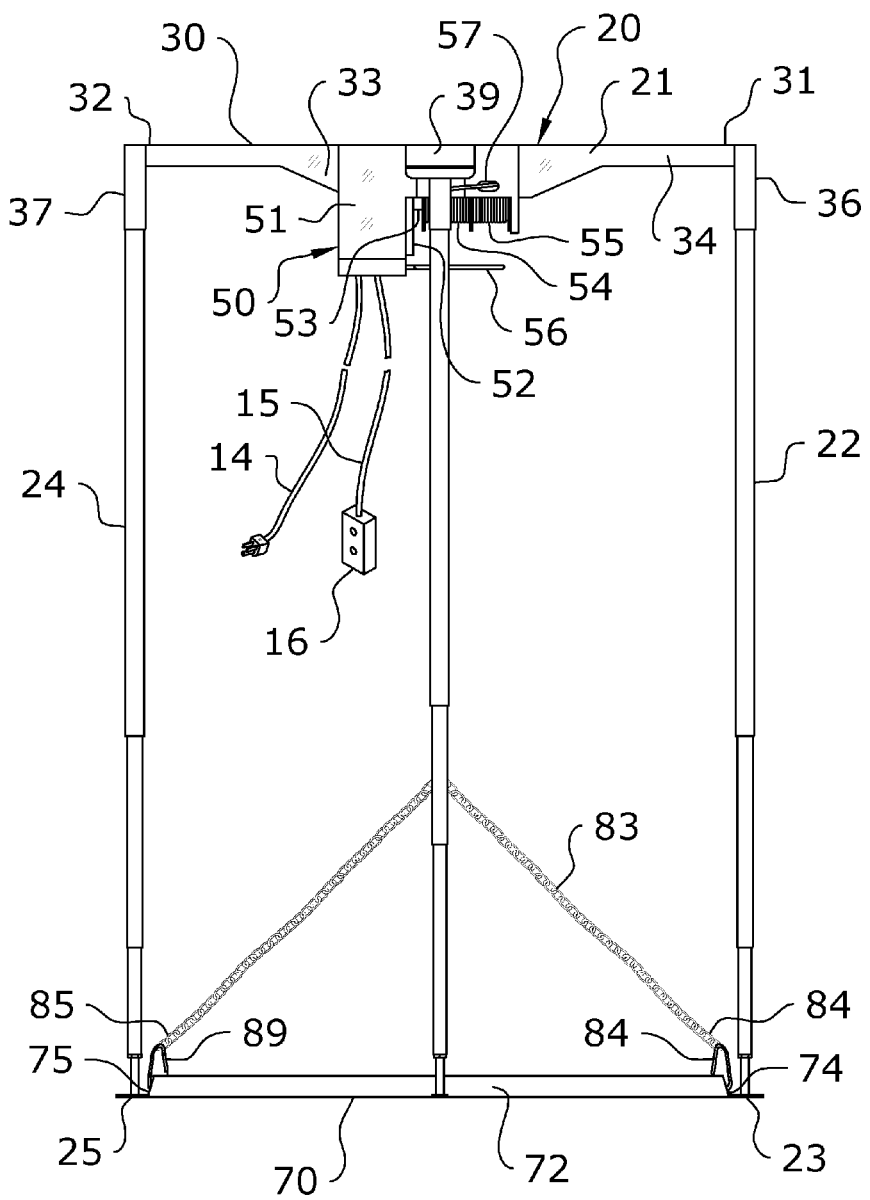
FIG. 4 is a second end view of the present invention.

As shown in FIGS. 1-3, a cross member 30 may extend between the first vertical support 22 and the second vertical support 24. The cross member 30 is generally comprised of an elongated member having a first end 31, a second end 32, and a central portion 33 between the first end 31 and the second end 32.

As best shown in FIGS. 1 and 2, the first side 34 of the cross member 30 will generally act as a mounting point for the drive assembly 50 of the present invention. Some or all of the cross member 30, such as the central portion 33 as shown in the figures, may be reinforced with extra width as shown in the figures or by additional structural reinforcements. This reinforcement aids in secured mounting the drive assembly 50 to the cross member 30.

The first vertical support 22 either extends from or connects to the first end 31 of the cross member 30 and the second vertical support 24 either extends from or connects to the second end 32 of the cross member 30. In some embodiments, the vertical supports 22, 24 may be integrally formed with the cross member 30.

In other embodiments, such as shown in the figures, a first receiver 36 extends perpendicularly with respect to the first end 31 of the cross member 30 to receive and connect with the first vertical support 22 and a second receiver 37 extends perpendicularly with respect to the second end 31 of the cross member 30 to receive and connect with the second vertical support 24.

The frame 20 is generally secured against an upper horizontal surface, such as a ceiling 19, using one or more upper mounts 38, 39. The upper mounts 38, 39 will generally comprise brackets, plates, or other connectors adapted to firmly secure the frame 20 to a ceiling 19, such as with fasteners. In a preferred embodiment as best shown in FIG. 1, a first upper mount 38 will extend from the second side 35 of the cross member 30 to secure the first side 21 of the frame 20 and a second upper mount 39 will extend from the second end 42 of the guide rail 50 to secure the second side 26 of the frame 20.

As shown throughout the figures, a guide rail 40 extends between the first side 21 and the second side 26 of the frame 20. The guide rail 40 may comprise any elongated member along which one or more cables 60, 64 may extend as described herein. A first end 41 of the guide rail 40 may be connected to the motor housing 51 as best shown in FIG. 1. In other embodiments, the first end 41 of the guide rail 40 may be connected to other structures of the first side 21 of the frame 20, such as the cross member 30. A second end 42 of the guide rail 40 is connected to the third vertical support 27. In some embodiments, the guide rail 40 may be integrally formed with other portions of the frame 20, such as the motor housing 51 or third vertical support 27.

Figure 5:
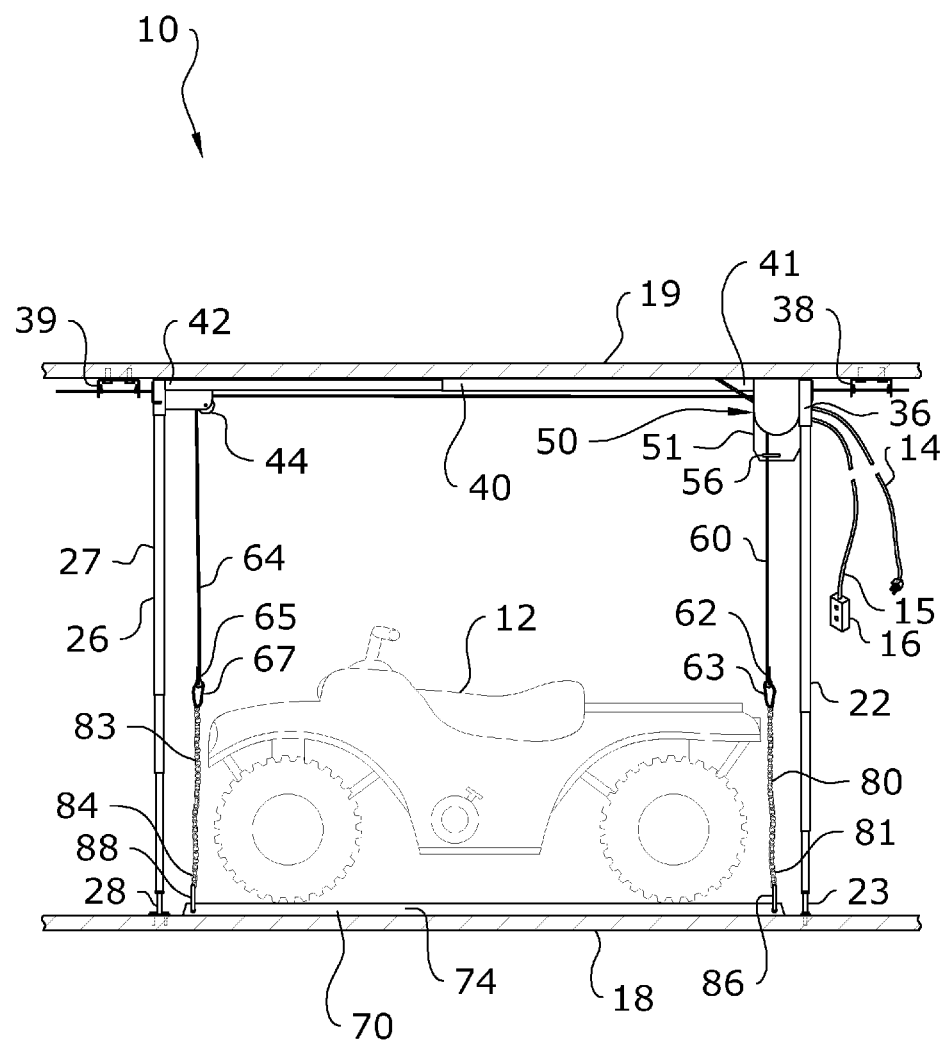
FIG. 5 is a side view of the present invention with a vehicle positioned on the lift member and the lift member in its lowered position.
Figure 6:
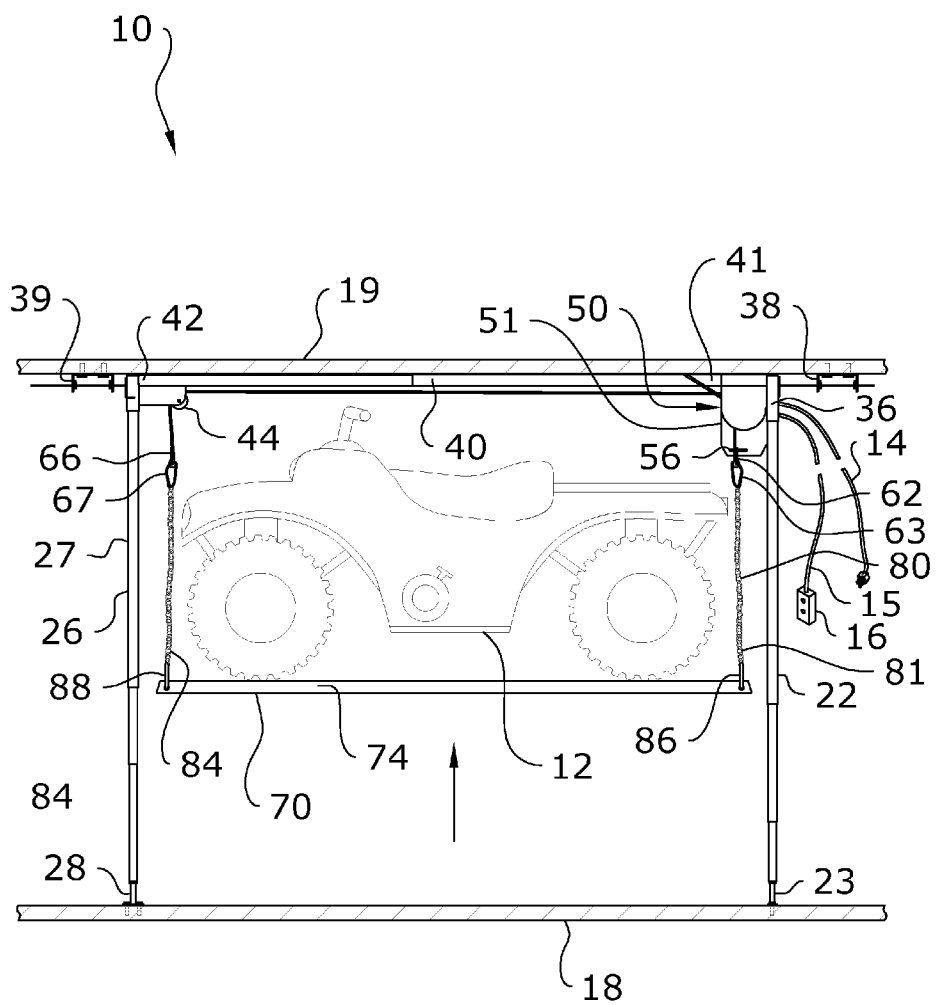
FIG. 6 is a side view of the present invention with a vehicle positioned on the lift member and the lift member in its raised position.
Figure 7:
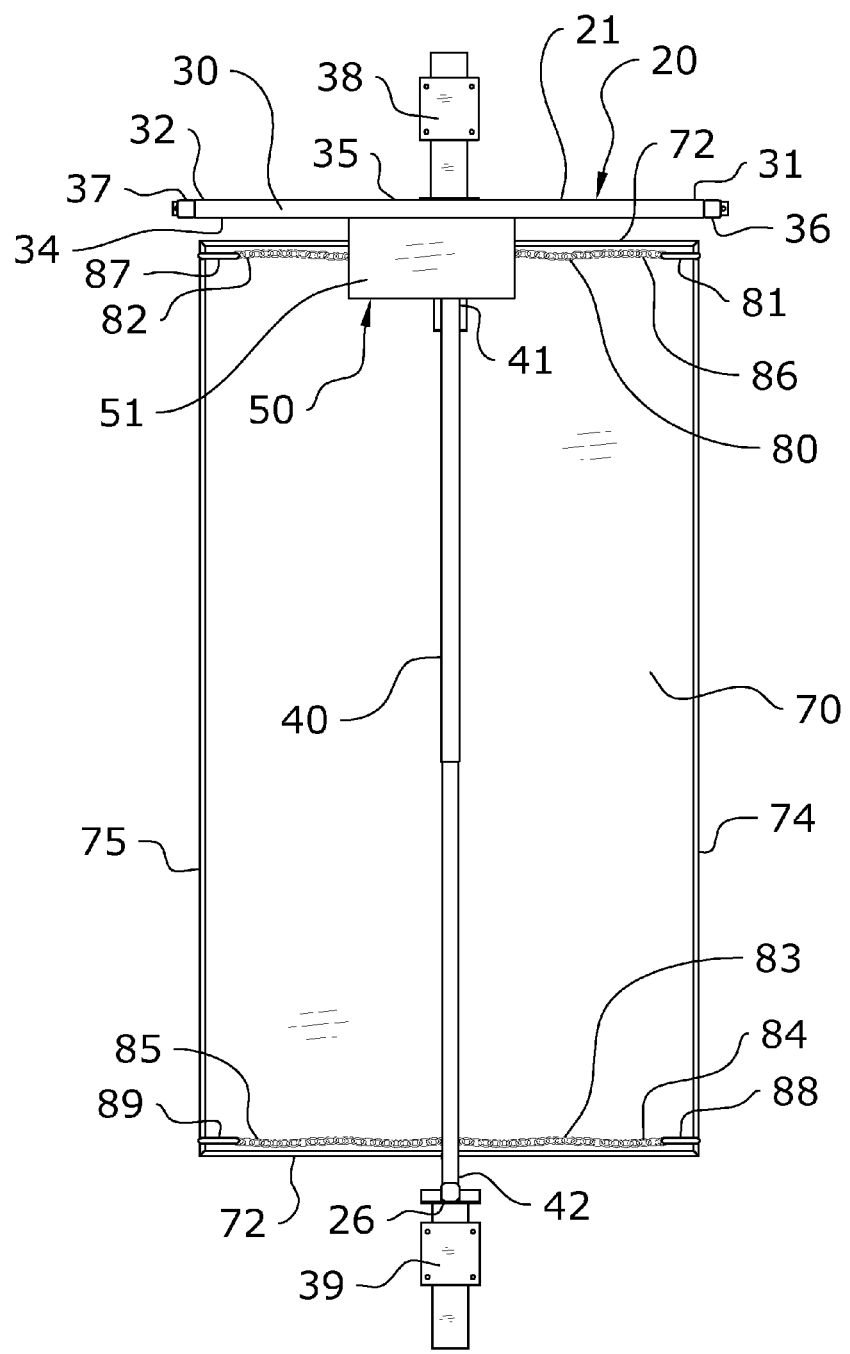
FIG. 7 is a top view of the present invention.

As best shown in FIGS. 5 and 6, a pulley wheel 44 may be positioned along the guide rail 40. The pulley wheel 44 is preferably positioned at or adjacent to the second end 42 of the guide rail 40 to reroute the second cable 64 from a horizontal to a vertical path prior to its linkage with the lift member 70. In some embodiments, multiple pulley wheels 44 may be utilized at various locations along the length of the guide rail 40. The positioning of the pulley wheel 44 in the exemplary figures should not be construed as limiting upon the scope of the present invention.

C. Drive Assembly.

Figure 8:
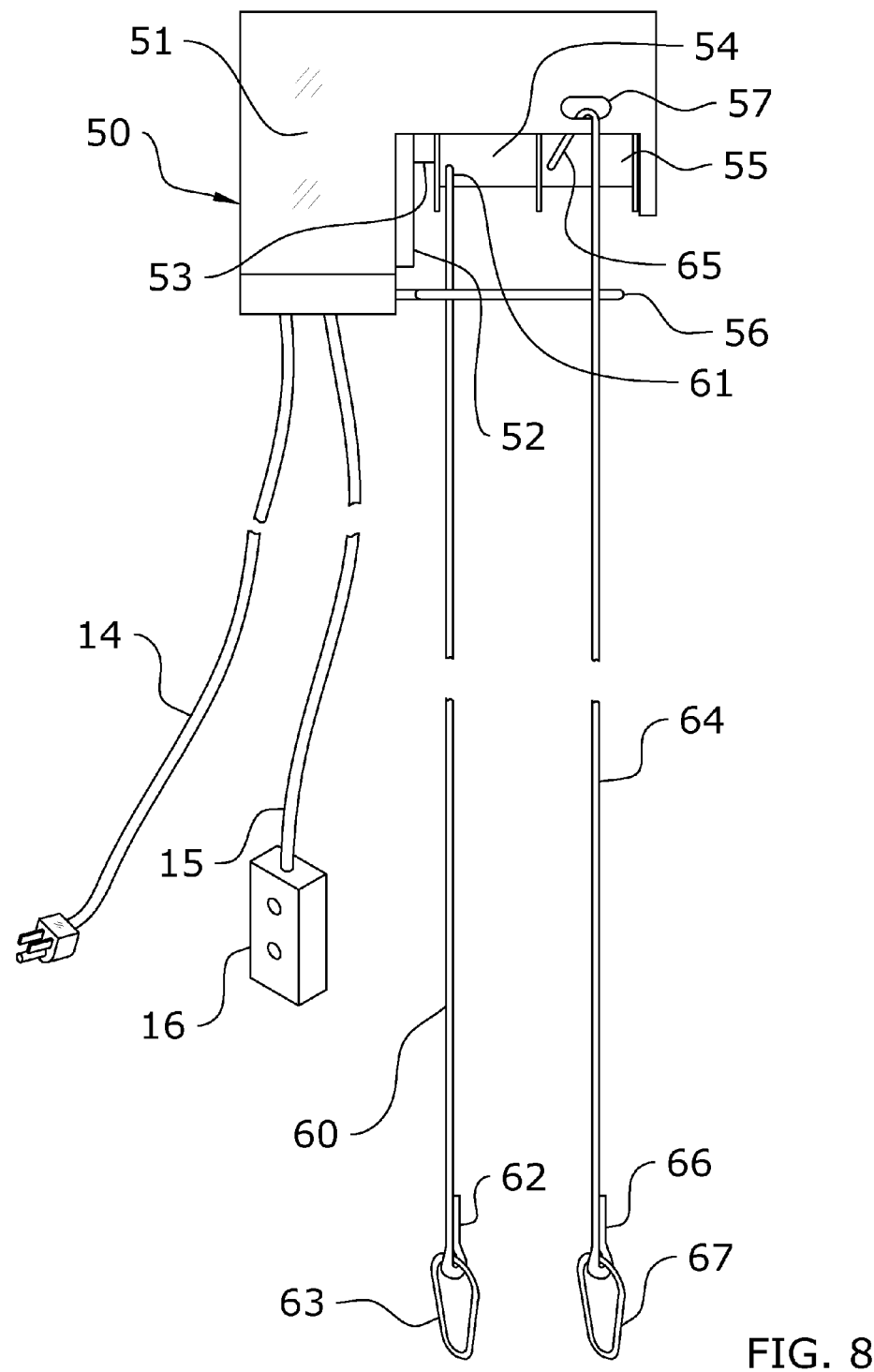
FIG. 8 is a front view of the drive assembly of the present invention.

The present invention includes a drive assembly 50 for lifting and lowering the lift member 70. As best shown in FIG. 8, the drive assembly 50 includes a motor 52 having a drive shaft 53 extending through one or more reels 54, 55. The motor 52 is operable to extend or retract the cables 60, 64 of the present invention to lift or lower the lift member 70.

Various types of motors 52 may be utilized such as the electric motor configuration shown in the exemplary figures. As best shown in FIG. 2, the drive assembly 50 may include a power cable 14 to power the motor 52. The drive assembly 50 may also include a controller cable 15 so that a controller 16 may be utilized to control the drive assembly 50. In some embodiments, the drive assembly 50 may be controlled by a wireless controller 16.

As best shown in FIG. 8, the motor 52 is preferably secured within a motor housing 51. In some embodiments of the present invention, however, the motor 52 may instead by secured directly to the frame 20. The motor housing 51 generally comprises a shroud which surrounds the main body of the motor 52 and partially surrounds the drive shaft 53 and reels 54, 55.

As shown throughout the figures, the motor housing 51 is mounted to the frame 51. In a preferred embodiment as shown in FIGS. 1 and 2, the motor housing 51 is secured to the reinforced central portion 33 of the cross member 30. However, the motor housing 51 could be secured to various other locations on the frame 20 in different embodiments of the present invention.

As best shown in FIG. 8, the drive shaft 53 of the motor 52 extends through a first reel 54 and a second reel 55. Various types of reels 54, 55 may be utilized, such as the cylindrical spooled configuration shown in the figures. The reels 54, 55 will preferably be positioned side-by-side as shown in FIG. 8 to allow for a compact configuration. However, other configurations may be utilized.

A first cable 60 is wound around the first reel 54 and a second cable 64 is wound around the second reel 55. When activated, the motor 52 will rotate the drive shaft 53 and reels 54, 55 in a first direction to wind in the cables 60, 64 to raise the lift member 70 and in a second direction to wind out the cables 60, 65 to lower the lift member 70. The cables 60, 65 may be comprised of any elongated members which are capable of supporting the weight of the lift member 70 in combination with the pulley system and drive assembly 50.

As best shown in FIG. 8, the first end 61 of the first cable 60 is secured to the first reel 54. The first cable 60 extends downwardly in a vertical orientation from the first reel 54. In some embodiments, a cable guide 56 which extends from the motor housing 51 may be provided through which the first cable 60 extends to maintain its substantially vertical orientation. The cable guide 56 may be comprised of any slotted or similarly-configured structure through which the first cable 60 may pass, such as the curved wire configuration shown in the figures.

The second end 62 of the first cable 60 is linked with the first end 71 of the lift member 70 so that the first cable 60 will raise and lower the first end 71 of the lift member 70. The second end 62 of the first cable 60 may in some embodiments be directly connected to the first end 71 of the lift member 70. In other embodiments as shown in the figures, a first connector 63 such as a looped bracket or the like may be included to connect the second end 62 of the first cable 60 with the first lift linkage 80 as described herein.

As best shown in FIG. 8, the first end 65 of the second cable 64 is secured to the second reel 55. The second cable 64 extends along the guide rail 40 of the present invention in a substantially horizontal orientation prior to turning ninety degrees as it extends through the pulley wheel 44. The second cable 64 then extends substantially vertically adjacent to the third vertical support 27. In some embodiments, a cable opening 57 may be included in the motor housing 51 through which the second cable 64 extends so as to guide the second cable 64 out of the motor housing 51 to extend along the direction of the guide rail 40.

The second end 66 of the second cable 64 is linked with the second end 72 of the lift member 70 so that the second cable 60 will raise and lower the second end 72 of the lift member 70. The second end 66 of the second cable 64 may in some embodiments be directly connected to the second end 72 of the lift member 70. In other embodiments as shown in the figures, a second connector 67 such as a looped bracket or the like may be included to connect the second end 66 of the second cable 64 with the second lift linkage 83 as described herein.

D. Lift Member.

As shown throughout the figures, the present invention includes a lift member 70 upon which an object 12 such as a vehicle may be positioned to be raised and/or lowered via the drive assembly 50 and cables 60, 64. The lift member 70 may be comprised of various shapes, sizes, and configurations to suit different applications. In a preferred embodiment, the lift member 70 comprises a platform which includes a first end 71, a second end 72, a first side 74, and a second side 75.

The lift member 70 is raised and/or lowered by the cables 60, 64. In some embodiments, the cables 60, 64 may be directly connected to the lift member 70. In a preferred embodiment as shown in the figures, a pair of lift linkages 80, 83 is provided to aid in leverage and prevent the lift member 70 from tipping over in either direction as it is lifted or lowered.

The lift linkages 80, 83 are generally comprised of elongated members with extend between the sides 74, 75 of the lift member 70 at its respective ends 71, 72. In a preferred embodiment, the lift linkages 80, 83 are comprised of chains, though other strong, durable linkages may be utilized.

In such a preferred embodiment as best shown in FIGS. 1 and 2, a first lift linkage 80 is connected at its first end 81 to a first link connector 86 positioned at the first end 71 of the lift member 70 adjacent to its first side 74. The first lift linkage 80 is similarly connected at its second end 82 to a second link connector 87 positioned at the first end 71 of the lift member 70 adjacent to its second side 75.

A second lift linkage 83 is connected at its first end 84 to a third link connector 88 positioned at the second end 72 of the lift member 70 adjacent to its first side 74. The second lift linkage 83 is similarly connected at its second end 85 to a fourth link connector 88 positioned at the second end 72 of the lift member 70 adjacent to its second side 75.

The link connectors 86, 87, 88, 89 are comprised of looped receivers which are secured to the lift member 70 and to which the lift linkages 80, 83 may be connected. The link connectors 86, 87, 88, 89 may be omitted in some embodiments, with the lift linkages 80, 83 being secured instead directly to the lift member 70.

E. Operation of Preferred Embodiment.

In use, the frame 20 is first secured between a pair of horizontal surfaces, such as a floor 18 and a ceiling 19 as shown in FIGS. 5 and 6. The upper mounts 38, 39 are secured to the upper horizontal surface, such as through fasteners. The footings 23, 25, 28 are then also secured to the lower horizontal surface such as through fasteners. With the frame 20 firmly secured in place, the lift member 70 may be utilized.

An object 12 such as a vehicle is positioned onto the lift member 70 its lowered positioned as best shown in FIG. 5. The object 12 may then be raised to be out of the way. Using a controller 16, the drive assembly 50 may be activated to wind in the cables 60, 64 around the reels 54, 55. As the cables 60, 64 are wound in, they will cause the lift member 70 to be raised to an elevation to be out of the way. Upon deactivation of the controller 16, the lift member 70 will be retained in its elevated position, such as shown in FIG. 6, until the object 12 is needed.

When desired, the lift member 70 may be lowered to retrieve the object 12. The controller 16 is reactivated, causing the drive assembly 50 to wind out the cables 60, 64 from around the reels 54, 55. As the cables 60, 64 are unwound they will cause the lift member 70 to be lowered in elevation until at ground level as shown in FIG. 5. The object 12 may then be retrieved form the lift member 70. The lift member 70 may be raised to be out of the way, or another object 12 may be placed onto the lift member 70 for storage.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A garage lift system, comprising:
   a frame having a first end and a second end, a guide rail extending from the first end to the second end, and two or more vertical supports, said vertical supports for securing the system between an upper horizontal surface and a lower horizontal surface;
   at least one upper mount to secure the frame to the upper horizontal surface;
   a lift member comprising a platform, the platform having a first end and a second end, the platform being positioned beneath the frame and extending between the first end and the second end of the frame, said platform for receiving the object to be raised and/or lowered thereon from beneath the object;

a drive assembly positioned adjacent to a first end of said guide rail, and comprising a first reel and a second reel;
a pulley wheel positioned adjacent to a second end of said guide rail;
a first cable wound around said first reel, having a first end connected to said first reel and a second end linked to the first end of said lift member; and
a second cable wound around said second reel, having a first end connected said second reel, and a second end linked to the second end of said lift member, said second cable extending along said guide rail and through said pulley wheel;
wherein said drive assembly is operable to raise or lower said lift member by extending or retracting said first cable and said second cable.

2. The garage lift system of claim 1, further comprising at least one footing adapted to secure said frame to the lower horizontal surface.

3. The garage lift system of claim 1, wherein said two or more vertical supports comprises a first vertical support, a second vertical support, and a third vertical support.

4. The garage lift system of claim 3, wherein said first vertical support is connected to said second vertical support by a cross member.

5. The garage lift system of claim 4, wherein said guide rail is connected at said first end to said cross member and at said second end to said third vertical support.

6. The garage lift system of claim 4, wherein said drive assembly is secured to said cross member.

7. The garage lift system of claim 6, wherein said drive assembly comprises a motor housing and a motor positioned within said motor housing.

8. The garage lift system of claim 7, wherein said guide rail is connected to said motor housing.

9. The garage lift system of claim 7, wherein said motor housing includes a cable guide, wherein said first cable extends through said cable guide.

10. The garage lift system of claim 9, wherein said motor housing includes a cable opening, wherein said second cable extends through said cable opening.

11. The garage lift system of claim 7, wherein a drive shaft of said motor extends through said first reel and said second reel.

12. The garage lift system of claim 11, wherein said first reel and said second reel and positioned side-by-side.

13. The garage lift system of claim 1, further comprising a first lift linkage connected between a first side and a second side of said lift member at said lift member's first end.

14. The garage lift system of claim 13, further comprising a second lift linkage connected between said first side and said second side of said lift member at said lift member's second end.

15. The garage lift system of claim 14, wherein said second end of said first cable is connected to said first lift linkage and said second end of said second cable is connected to said second lift linkage.

16. A garage lift system, comprising:
a frame comprising a first end and a second end, and consisting of: a first vertical support, a second vertical support, and a third vertical support, each vertical support comprising a footing for securing the frame to a floor;
a cross member extending between said first vertical support and said second vertical support;
a guide rail extending between the cross member and the third veritcal support;
a first upper mount extending from said cross member, said first upper mount being adapted to secure said frame to a ceiling;
a second upper mount extending from said third vertical support, said second upper mount being adapted to secure said frame to said ceiling;
a drive assembly positioned adjacent to the first end of said guide rail;
a pulley wheel positioned adjacent to the second end of said guide rail;
a lift member comprising a platform having a first end and a second end positioned beneath said frame, the platform extending from the first end to the second end of the frame, the platform for receiving one or more objects to be raised and/or lowered thereon from beneath the object;
a first lift linkage connected between a first side and a second side of said lift member at said lift member's first end;
a second lift linkage connected between said first side and said second side of said lift member at said lift member's second end;
a motor housing secured to said cross member, the motor positioned within the motor housing;
a first reel and a second reel positioned on a drive shaft of the motor, side-by-side within the motor housing;
a first cable wound around said first reel, wherein a first end of said first cable is connected to said first reel and a second end of said first cable is linked to the first lift linkage, wherein said first cable extends through a cable guide extending from said motor housing, wherein said second cable extends through a cable opening of said motor housing; and
a second cable wound around said second reel, wherein a first end of said second cable is connected to said second reel, wherein said second cable extends along said guide rail and through said pulley wheel, wherein a second end of said second cable is linked to the second lift linkage, wherein said first and second cables run parallel to the longitudinal axis of the guide rail;
wherein said drive assembly is operable to raise or lower said lift member by extending or retracting said first cable and said second cable.

17. The garage lift system of claim 16, wherein said motor is comprised of an electric motor.

18. The garage lift system of claim 1, wherein the platform is lifted to a raised position.

19. A garage lift system, comprising:
a frame comprising a first end and a second end, a guide rail extending between the first and second ends and two or more vertical supports, said vertical supports for securing between an upper horizontal surface and a lower horizontal surface;
a first upper mount adjacent to the first end of the frame and a second upper mount adjacent to the second end of the frame for mounting the frame to the upper horizontal surface;
a lift member comprising a first end and a second end, and being positioned beneath the frame, extending from the first to the second end of the frame, the lift member for receiving an object to be raised and/or lowered thereon from beneath the object;
a drive assembly comprising at least a first and a second reel, positioned adjacent to the guide rail;
a pulley wheel adjacent to the guide rail; and a first cable wound around the first reel and a second cable wound around the second reel, the first and second cables connected to the first and second ends, respectively, of the lift member;

wherein the drive assembly is operable to raise and/or lower the lift member by extending or retracting the first and second cables.

* * * * *